United States Patent
Zarkhin

(10) Patent No.: US 9,985,520 B2
(45) Date of Patent: May 29, 2018

(54) PULSE WIDTH MODULATOR FOR DC/DC CONVERTERS

(71) Applicant: Continental Automotive Systems, Inc., Auburn Hills, MI (US)

(72) Inventor: Mikhail Zarkhin, West Bloomfield, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days. days.

(21) Appl. No.: 15/180,881

(22) Filed: Jun. 13, 2016

(65) Prior Publication Data

US 2016/0301304 A1 Oct. 13, 2016

Related U.S. Application Data

(63) Continuation-in-part of application No. 14/089,955, filed on Nov. 26, 2013.

(60) Provisional application No. 61/737,858, filed on Dec. 17, 2012.

(51) Int. Cl.
*H02M 3/156* (2006.01)
*H02M 3/155* (2006.01)
*H02M 1/00* (2006.01)

(52) U.S. Cl.
CPC .... *H02M 3/156* (2013.01); *H02M 2001/0025* (2013.01); *H02M 2003/1557* (2013.01)

(58) Field of Classification Search
CPC ............ H02M 3/00; H02M 3/02; H02M 3/04; H02M 3/10; H02M 3/145; H02M 3/155; H02M 3/156; H02M 3/1563; H02M 3/157; H02M 3/158; H02M 3/1582; H02M 3/1588; H02M 1/08; H02M 2001/0016; H02M 2001/0022; H02M 2001/0025; H02M 2003/1566; H02M 2003/1557; Y02B 70/1466; H03K 4/00; H03K 4/06; H03K 4/063; H03K 4/066; H03K 4/08; H03K 4/48; H03K 4/50; H03K 4/60; H03K 4/90; H03K 7/00; H03K 7/08
USPC ........ 323/205–211, 222–226, 259, 271–275, 323/282–288, 299–303, 351; 363/19, 363/21.01, 21.18, 26, 41, 73, 123–127; 327/131–140
See application file for complete search history.

(56) References Cited

U.S. PATENT DOCUMENTS

2008/0224625 A1\* 9/2008 Greenfeld .......... H05B 33/0851
315/201
2011/0316511 A1\* 12/2011 Wang .................... H02M 3/156
323/285

\* cited by examiner

*Primary Examiner* — Timothy J Dole
*Assistant Examiner* — Carlos Rivera-Perez

(57) ABSTRACT

A conventional single-ended, primary-inductance converter (SEPIC) has its switching frequency determined by a controller, which determines the duty cycle at which the switch operates by measuring differences between the SEPIC output voltage and a reference voltage. A controller is coupled to a switch of the SEPIC and provides a pulse train which determines the duty cycle and frequency at which the switch operates. The duty cycle is selectable between first and second percentages, the frequency is selectable between first and second frequencies, and the duty cycle and frequency are selected by the controller responsive to a voltage at an input voltage terminal of the SEPIC. Output voltage overshoot and undershoot are reduced.

6 Claims, 5 Drawing Sheets

US 9,985,520 B2

PULSE WIDTH MODULATOR FOR DC/DC CONVERTERS

RELATED APPLICATIONS

This application is a continuation-in-part of U.S. application Ser. No. 14/089,955, which was filed Nov. 26, 2013, and entitled, "PWM Generation for DC/DC Converters with Frequency Switching." The content of that application is incorporated herein by reference.

BACKGROUND

The single-ended primary inductance convertor or SEPIC is a well-known DC-to-DC voltage convertor that can provide an output voltage greater or less than an input voltage. It also does not change or reverse an input voltage polarity. A detailed explanation of SEPICs is available from Daniel W. Hart, Power Electronics, McGraw-Hill Companies, Inc., 2011, pages 231-235, the content of which is incorporated herein by reference.

Referring now to FIG. 1, a SEPIC 100 needs a switch 24, typically embodied as a metal oxide semiconductor field effect transistor (MOSFET) to charge and discharge inductors 22, 28 and capacitors 26 and 32 as described by Hart, supra. The SEPIC output voltage i.e., $V_{out}$ is the function of the input voltage, $V_{in}$ and a duty ratio of the switch in Continuous Conduction Mode (CCM) and is the function of the input voltage, Vin, output power and a duty ratio of the switch in Discontinuous Conduction Mode (DCM).

In Automotive applications good dynamic response to changes of the input voltage and output power is desired. This is only possible, if SEPIC is running in DCM. When SEPIC input voltage decreases, at some point it is necessary, as known in previous art, to reduce SEPIC operating frequency in order to keep it running in DCM. The change of the operating frequency may cause the overshoot or undershoot of the SEPIC output voltage.

A power supply that can minimize or at least reduce the overshoot and undershoot of prior art SEPIC convertors would be an improvement over the prior art.

DETAILED DESCRIPTION

Figure 1:
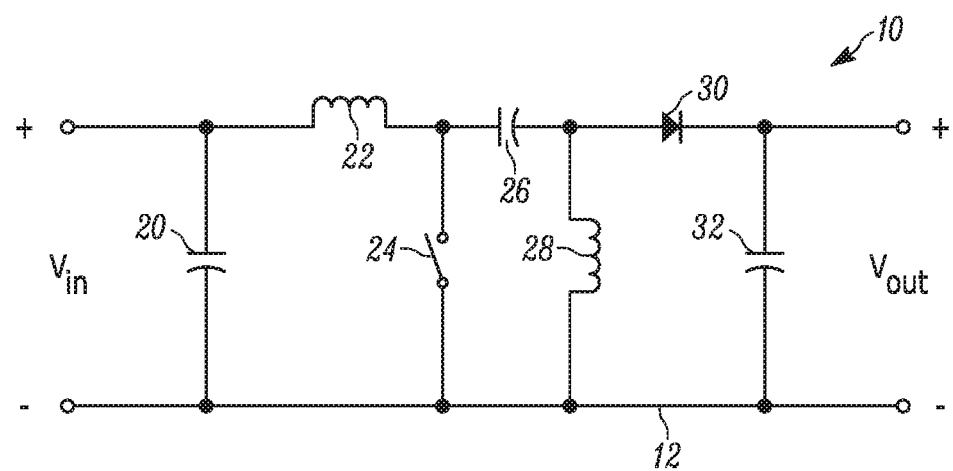
FIG. 1 depicts a prior art single-ended primary inductance convertor or SEPIC.
Figure 2:
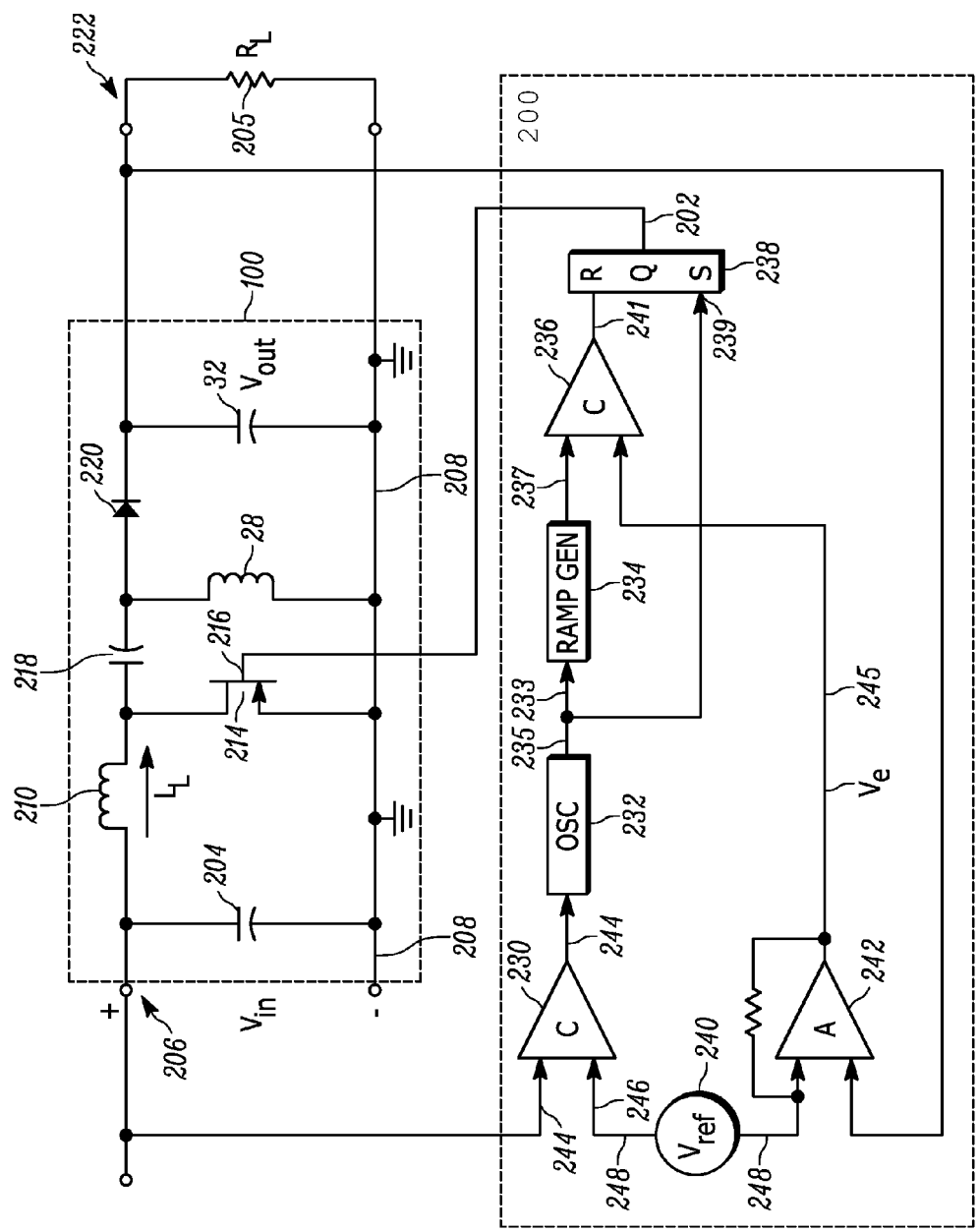
FIG. 2 depicts a prior art SEPIC and a controller, which outputs a pulse width modulated signal to the SEPIC's control switch and which minimizes overshoot and undershoot of the output voltage.

FIG. 2 depicts a power supply comprising a prior art SEPIC 100 and a controller 200. The SEPIC 100, which is also shown in FIG. 1, includes an input filter capacitor 204 across an input voltage terminal 206, to which an input voltage, $V_{in}$, (not shown) is provided. The magnitude of the input voltage, $V_{in}$, which is typically provided by a vehicle battery, is measured or determined relative to a reference potential node 208. The reference potential voltage in a vehicle is typically at zero or near zero volts and commonly referred to as "ground" potential.

A series-connected "primary" inductor 210 connects an input voltage, $V_{in}$, to a semiconductor switch 214, preferably embodied as a MOSFET the gate or control input 216 of which is connected to an output node 202 of the controller 200. As is well known, the MOSFET switch 214 "opens" and "closes" responsive to voltages on the control input 216. When the switch 214 is "closed," i.e., the MOSFET is conducting, the switch 214 shunts current flowing through a first inductor 210, $i_L$ to ground 208 and current from the capacitor 218 into the second inductor 28. When the switch 214 is open, i.e., not conducting, it forces the first inductor current, $i_L$ to flow through a coupling capacitor 218 to a steering diode 220 and the second inductor current to a steering diode 220, which directs the current to a load, $R_L$ 205.

The output voltage, $V_{out}$, of the SEPIC 100, is measured across an output voltage terminal 222 and reference potential node 208. The duty cycle ratio of the switch open time, DT to its closed time, 1-DT, determines the output voltage, $V_{out}$. The output voltage is thus a function of the duty cycle of the switch 214. That duty cycle is determined by the controller 200 to maintain the output voltage Vout constant.

The preferred embodiment of the controller 200 comprises two comparators 230, 236, an oscillator 232, a ramp generator 234, a D flip-flop 238, an error amplifier 242 and a voltage reference source 240. As described more fully below, the output of the flip-flop 238 is a pulse train having a duty cycle determined by changes in the SEPIC output voltage, $V_{out}$ relative to a reference voltage 240.

The first comparator 230, which is known, has two inputs 244 and 246. The first input 244 is connected to the input voltage terminal 206 of the SEPIC 100. The other input terminal 246 is connected to the output terminal 248 of the voltage reference source 240.

The first comparator 230 has an output terminal 245 coupled to the oscillator 232. The oscillator 232 is constructed to provide at an output terminal 235 thereof output signals of two frequencies synchronizing the operation of SEPIC responsive to the voltage input to the oscillator by the first comparator 230. Stated another way, the oscillator 232 produces an output signal, the frequency of which changes between two frequencies or values responsive to the input signals to the oscillator 232 from the comparator 230.

The oscillator output signal 233 terminal 235 is connected to an input terminal 233 of a conventional ramp generator 234. The ramp generator 234 is also known as a "saw tooth" generator because the shape of its output signal 237 resembles a saw tooth: it increases continuously and linearly until a peak value is reached at the end of the given operating cycle, then drops to zero.

The oscillator output terminal 235233 is also connected to a set terminal 239 of a conventional, D-type flip-flop 238. The "reset" input 241 of the flip-flop 238 is connected to the output of a second comparator 236.

The second comparator 236 has one input connected to the ramp generator 234 output. A second input is connected to the output of an error amplifier 242.

The error amplifier 242 receives two input signals: the output voltage 222 of the SEPIC and the reference voltage 248. The error amplifier 242 produces an output signal 245 that is proportional to the magnitude of the difference between the reference voltage 248 and the SEPIC output voltage 222. As the output voltage 222 of the SEPIC 100 changes relative to the reference 208, the output voltage 245 of the error amplifier 242 changes accordingly. The error amplifier output 245 thus determines when the second comparator 236 changes its output signal, thereby, "toggling" the D flip-flop 238 and producing a pulse train input to the gate 216 of the MOSFET 214.

Figure 3:
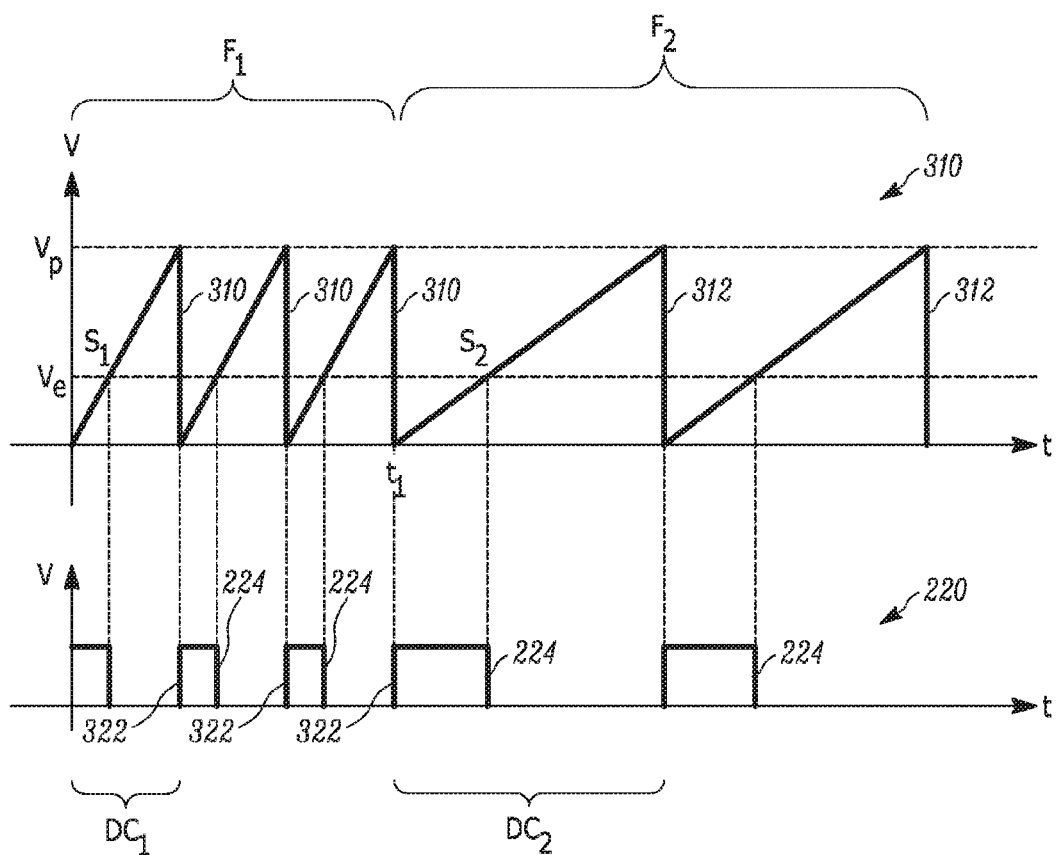
FIG. 3 is a graph of a saw tooth signal and a pulse width modulation (PWM) output signal for two operating frequencies implemented in prior art.
Figure 4:
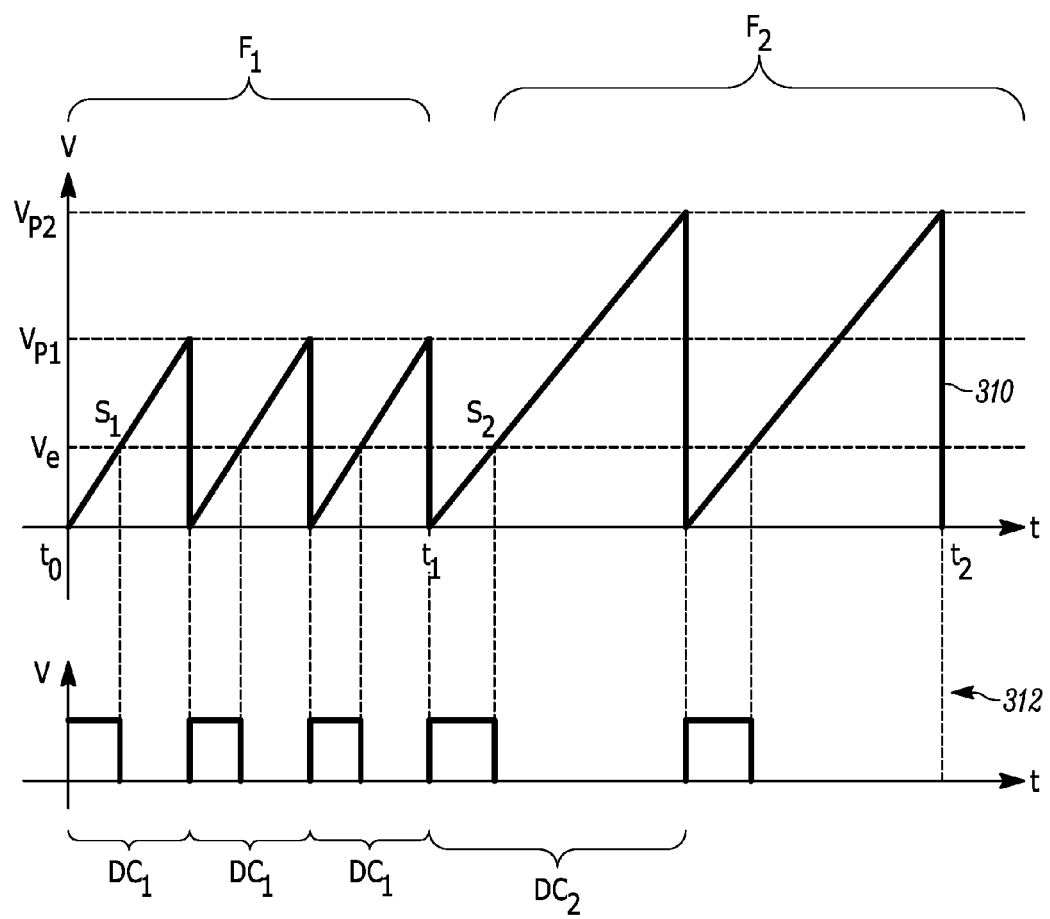
FIG. 4 is a graph of a saw tooth signal and a pulse width modulation (PWM) output signal for two operating frequencies, which eliminates SEPIC output voltage overshoot or undershoot, when operating frequency changes.
Figure 5:
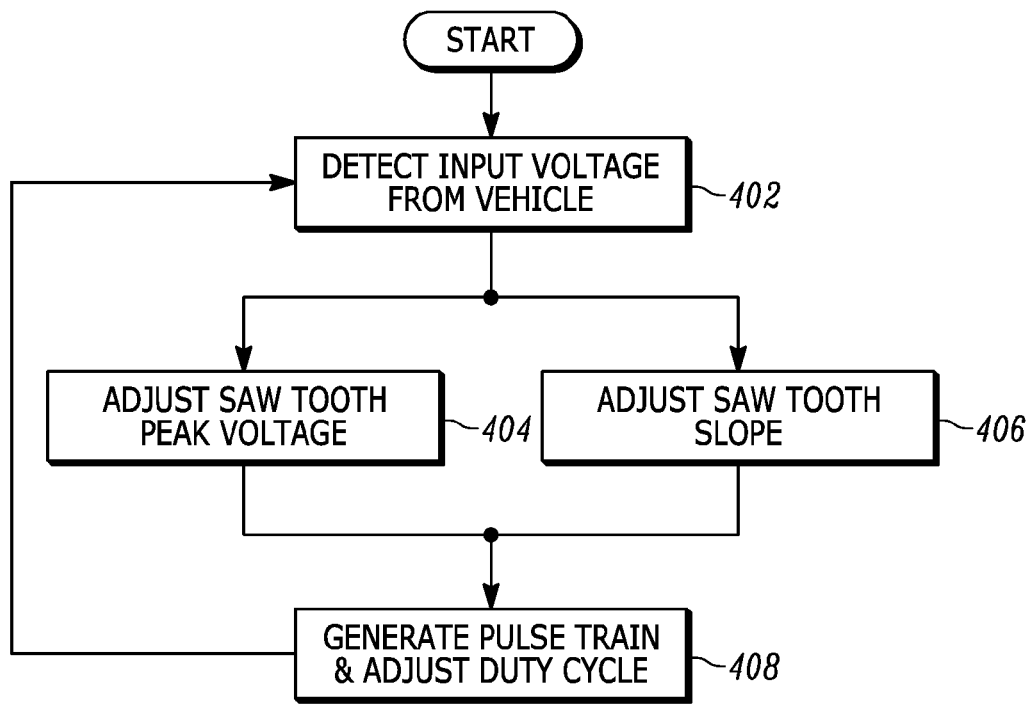
FIG. 5 depicts steps of a method.

FIG. 3 depicts the saw tooth wave form 310 output from the ramp generator 234 and a pulse train 322 output from the D flip-flop 228 for two operating frequencies as known in prior art and FIG. 4, depicts the saw tooth wave form provided by the circuit shown in FIG. 2, and which essentially eliminates output voltage overshoot or undershoot when operating frequency changes.

In FIG. 3, the saw tooth wave form 310 between $t_0$ and $t_1$ has a first frequency, denominated as $F_1$. The output pulse train 322 during that same time period has a first duty cycle denominated as $DC_1$.

At a later time denominated as $t_1$, at which the input voltage, $V_{in}$ to the SEPIC 100 decreases, the input voltage to the controller 200 also drops below the reference voltage 240. The drop in the input voltage $V_{in}$ causes the first comparator 202 to change its output state, which in turn changes the oscillator frequency to a lower frequency value $F_2$, not shown per se in FIG. 3 and FIG. 4, but clearly depicted by the lower frequency saw tooth waveform 310 that begins at $t_1$.

At time t1, the SEPIC output voltage does not change instantaneously. The error voltage, $V_e$, therefore does not change instantaneously and together with the new slope of the ramp generator will define the duty cycle DC2. Those of ordinary skill in the art should thus realize that as operating frequency of the SEPIC running in DCM changes, the output voltage will stay constant only if the output power will stay constant, i.e. the product of cycle energy and operating frequency before and after frequency change is constant.

Still referring to FIG. 3, since the peak voltage of the saw tooth signal does not change, the duty cycle DC1 at operating frequency F1 is equal to duty cycle DC2 at operating frequency F2. If K is the ratio of two operating frequencies, i.e. K=F1/F2, then to eliminate the SEPIC output voltage overshoot or undershoot when operating frequency changes, one need to have E2/E1=K, where E1, E2 are cycle energy at respective operating frequency F1, F2. Cycle energy of the SEPIC converter is proportional to the second power of the current change in SEPIC inductors. Current change in the SEPIC inductors is proportional to the switch ON time Switch ON time is proportional to the duty cycle and inversely proportional to operating frequency. Thus cycle energy is proportional to the square of the ratio of duty cycle and operating frequency. In prior art the duty cycle stays the same, so the product of the cycle energy and operating frequency will change, when operating frequency is changed, and in turn, produce the overshoot or undershoot of the SEPIC output voltage.

In FIG. 4, the duty cycle DC1 at operating frequency F1 is not equal to the duty cycle DC2 at operating frequency F2. When operating frequency is switched from F1 to F2, the saw tooth peak voltage is increased by the factor of square root of K, or saw tooth slope is decreased by the factor of square root of K and duty cycle D2=D1/SQR (K). In that case the product of cycle energy and operating frequency is not changing when operating frequency is changed and output voltage of the SEPIC converter running in DCM stays constant.

The foregoing description is for purposes of illustration only. The true scope of the invention is set forth in the following claims.

What is claimed is:

1. A pulse width modulator for a single-ended primary inductance converter (SEPIC) that receives a D.C. input voltage at an input voltage terminal and which produces a D.C. output voltage at an output voltage terminal, the D.C. output voltage being different in magnitude from the D.C. input voltage, the pulse width modulator comprising:
   a first comparator comprising:
      a first input coupled to the input voltage terminal of the SEPIC;
      a second input coupled to a reference voltage; and
      an output,
      the first comparator being configured to provide an output signal having two possible values, responsive to whether a voltage at the SEPIC input voltage terminal is greater than or less than the reference voltage;
   a second comparator having first and second inputs and an output;
   an error amplifier having a first input coupled to the SEPIC output voltage terminal, a second input coupled to the reference voltage and an output coupled to the second input of the second comparator;
   an oscillator having a control input coupled to the output of the first comparator and an output, the oscillator being configured to generate a first periodic signal having a first frequency and generate a second periodic signal having a second frequency, responsive to the output signal from the first comparator, the first frequency is greater than the second frequency;
   a voltage ramp generator having an input coupled to the output of the oscillator and an output coupled to the first input of the second comparator, the voltage ramp generator generating at its output a first voltage ramp signal in response to the oscillator providing the first periodic signal to the voltage ramp generator and a second voltage ramp signal responsive to the oscillator providing the second periodic signal to the voltage ramp generator;
   a flip-flop having a reset input coupled to the output of the second comparator, a set input coupled to the output of the oscillator and an output coupled to a control terminal of a SEPIC switch of the SEPIC,
   wherein a product of cycle energy and operating frequency of the SEPIC does not change when the operating frequency of the SEPIC changes from the first frequency to the second frequency.

2. The pulse width modulator of claim 1, wherein a ratio of the first frequency to the second frequency is K, and a peak voltage of the second voltage ramp signal is greater than a peak voltage of the first voltage ramp signal by a square root of K.

3. The pulse width modulator of claim 2, wherein a slope of the second voltage ramp signal is decreased, relative to a slope of the first voltage ramp signal, by a factor of the square root of K, and a duty cycle of the second voltage ramp signal is equal to a duty cycle of the first voltage ramp signal divided by the square root of K.

4. A power supply comprising:
   a single-ended primary-inductance converter (SEPIC) having an input voltage terminal, an output voltage terminal, a reference voltage terminal and a switch configured to connect and disconnect one end of a primary inductance having first and second ends, to the reference voltage terminal;

a controller coupled to the switch and providing a pulse train thereto, the controller determines a duty cycle and frequency at which the switch operates, the controller comprising:

a first comparator having a first input coupled to the input voltage terminal of the SEPIC, a second input coupled to a reference voltage and an output, the first comparator configured to provide a signal at its output that has two possible states, the states being determined by the first comparator responsive to whether a voltage at the SEPIC input voltage terminal is greater than or less than the reference voltage;

a second comparator having first and second inputs and an output;

an error amplifier having a first input coupled to the SEPIC output voltage terminal, a second input coupled to the reference voltage and an output coupled to the second input of the second comparator;

an oscillator having a control input coupled to the output of the first comparator and an output, the oscillator being configured to generate at its output, a first periodic signal having a first frequency and generate at the output a second periodic signal having a second frequency, the first and second output signals being selectively generated by the oscillator responsive to the state of the signal output from the first comparator, the second frequency being less than the first frequency;

a voltage ramp generator having an input coupled to the output of the oscillator and an output coupled to the first input of the second comparator, the voltage ramp generator generating first and second different voltage ramp signals at its output responsive to a frequency of the signal generated at the output of the oscillator; and a flip-flop having a reset input coupled to the output of the second comparator, a set input coupled to the output of the oscillator and an output coupled to a control terminal of the SEPIC switch, wherein a product of cycle energy and operating frequency of the SEPIC does not change when the operating frequency of the SEPIC changes from the first frequency to the second frequency.

5. The power supply of claim 4, wherein a ratio of the first frequency to the second frequency is K, and a peak voltage of the second voltage ramp signal is greater than a peak voltage of the first voltage ramp signal by the square root of K.

6. The power supply of claim 5, wherein a slope of the second voltage ramp signal is decreased, relative to a slope of the first voltage ramp signal, by a factor of the square root of K, and a duty cycle of the second voltage ramp signal is equal to the duty cycle of the first voltage ramp signal divided by the square root of K.

* * * * *